United States Patent
Haslam

(10) Patent No.: US 11,173,956 B2
(45) Date of Patent: Nov. 16, 2021

(54) AIR RESERVOIR FOR A STEERING AXLE AND METHOD OF CONSTRUCTION

(71) Applicant: DEXTER TRAILER PRODUCTS OF CANADA CORPORATION, Ingersoll (CA)

(72) Inventor: Neil Haslam, Hamilton (CA)

(73) Assignee: Dexter Trailer Products of Canada Corporation, Ontario (CA)

(*) Notice: Subject to any disclaimer, the term of this patent is extended or adjusted under 35 U.S.C. 154(b) by 312 days.

(21) Appl. No.: 16/404,669

(22) Filed: May 6, 2019

(65) Prior Publication Data

US 2020/0010117 A1    Jan. 9, 2020

Related U.S. Application Data

(60) Provisional application No. 62/667,486, filed on May 5, 2018.

(51) Int. Cl.
| | | |
|---|---|---|
| *B62D 13/04* | (2006.01) | |
| *B60B 35/04* | (2006.01) | |
| *B60B 35/08* | (2006.01) | |
| *B62D 7/22* | (2006.01) | |
| *B62D 7/08* | (2006.01) | |

(52) U.S. Cl.
CPC ............. *B62D 13/04* (2013.01); *B60B 35/04* (2013.01); *B60B 35/08* (2013.01); *B62D 7/08* (2013.01); *B62D 7/228* (2013.01); *B60B 2310/226* (2013.01); *B60B 2320/10* (2013.01)

(58) Field of Classification Search
CPC .......... B62D 13/04; B62D 7/228; B62D 7/08; B62D 7/144; B60B 35/04; B60B 35/08; B60B 2320/10; B60B 2310/226; B60B 35/16; B60B 35/163
See application file for complete search history.

(56) References Cited

U.S. PATENT DOCUMENTS

| | | | | |
|---|---|---|---|---|
| 3,527,316 | A * | 9/1970 | Jones, Jr. .............. | B60B 35/109 180/437 |
| 7,416,198 | B2 * | 8/2008 | Blaszynski ............ | B62D 7/228 280/89.12 |
| 9,073,402 | B2 * | 7/2015 | Elbers .................. | B60G 21/051 |
| 2008/0018070 | A1 * | 1/2008 | Gottschalk ............... | B62D 7/18 280/86.5 |

(Continued)

*Primary Examiner* — Kevin Hurley
*Assistant Examiner* — Marlon A Arce
(74) *Attorney, Agent, or Firm* — Botkin & Hall, LLP

(57) ABSTRACT

An air reservoir for a steering axle is mounted on a trailer, the steering axle comprising a pair of rotation pivoting wheel assemblies. Each wheel assembly has a rotation plate and a steering arm connected thereto. A rod pivotally connects the steering arms, each wheel assembly being rotatably connected to either end of the axle. An air stabilizer assembly is mounted on the axle and is connected to the rod, the air stabilizer assembly having an inflatable damper assembly thereon. An air supply is fluidly connected to an air inlet on the axle, the air inlet being fluidly connected to the damper assembly. The air stabilizer assembly dampens pivotal movement of the wheel assemblies when compressed air from the air reservoir fills the damper assembly. The air stabilizer assembly allows the wheel assemblies to rotate more freely when pressure of the compressed air within the damper assembly is reduced.

6 Claims, 8 Drawing Sheets

(56) References Cited

U.S. PATENT DOCUMENTS

2009/0020983 A1\* 1/2009 Broemeling ............. B60G 9/02
 280/476.1
2017/0217486 A1\* 8/2017 Eveley ................... B62D 7/228

\* cited by examiner

AIR RESERVOIR FOR A STEERING AXLE AND METHOD OF CONSTRUCTION

TECHNICAL FIELD

The present disclosure relates to steering axles, and in particular to a fluid reservoir for a steering axle mounted on a trailer and a method of construction thereof.

BACKGROUND

Air reservoirs mounted on trailers for steering axles are known in the art. In an example prior art embodiment, one air reservoir is mounted on the trailer for each steering axle and each air reservoir is connected to a compressed air supply of the trailer, wherein each air reservoir is separate from the axle and adds additional weight and expense for the air reservoir and installation components, including support components and installation time. The air reservoirs require additional space beneath the trailer and increase the air resistance or drag on the trailer during travel compared to trailers without air reservoirs.

SUMMARY OF PARTICULAR EMBODIMENTS

It will be appreciated by those skilled in the art that other variations of the embodiments described below may also be practiced without departing from the scope of the invention. Further note, these embodiments, and other embodiments of the present invention will become more fully apparent from a review of the description and claims which follow.

In one embodiment, the present disclosure relates to an air reservoir for a steering axle mounted on a trailer, the steering axle comprising a pair of rotation pivoting wheel assemblies. Each wheel assembly has a rotation plate and a steering arm connected thereto, there being two rotation plates and two steering arms. A rod pivotally connects the steering arms, each wheel assembly being rotatably connected to either end of the axle. Each wheel assembly is connected to pivot about a vertical axis through each rotation plate. An air stabilizer assembly is mounted on the axle and is connected to the rod, the air stabilizer assembly having an inflatable damper assembly thereon. The air reservoir is located within the axle. An air supply from the trailer is fluidly connected to an air inlet on the axle, the air inlet from the axle being fluidly connected to the damper assembly. The air stabilizer assembly dampens pivotal movement of the wheel assemblies when compressed air from the air reservoir fills the damper assembly. The air stabilizer assembly allows the wheel assemblies to rotate more freely when pressure of the compressed air within the damper assembly is reduced.

In another embodiment, there is described an air reservoir for use with a steering axle mounted on a trailer, the steering axle comprising a tube section with a pair of rotation pivoting wheel assemblies extending from opposing ends thereof, each wheel assembly having a rotation plate and a steering arm connected thereto, there being two rotation plates and two steering arms; a rod pivotally connecting the steering arms, each wheel assembly being rotatably connected to either end of the tube section; each wheel assembly being connected to pivot about a vertical axis through each rotation plate; an air stabilizer assembly being mounted on the tube section and being connected to the rod, the air stabilizer assembly having an inflatable damper assembly thereon; the air reservoir located within the tube section, a compressed air supply from the trailer being fluidly connected to an air inlet on the axle, an air outlet from the axle being fluidly connected to the damper assembly, the air stabilizer assembly dampening pivotal movement of the wheel assemblies when compressed air from the air reservoir fills the damper assembly and allowing the wheel assemblies to rotate more freely when a pressure of compressed air within the damper assembly is reduced; and a controller to control a flow of compressed air between the air outlet and the damper assembly.

In another embodiment, a method of constructing an air reservoir for use with a steering axle mounted on a trailer is described, wherein the steering axle has a pair of beam ends and a pair of rotation pivoting wheel assemblies, each wheel assembly has a rotation plate and a steering arm connected thereto, there being two rotation plates and two steering arms, a rod pivotally connecting the steering arms, wherein each wheel assembly is rotatably connected to either end of the axle, and connected to pivot about a vertical axis through each rotation plate, and an air stabilizer assembly mounted on the axle and being connected to the rod, the air stabilizing assembly having an inflatable damper assembly thereon; the method comprising locating an air reservoir for compressed air within the axle by locating an air inlet and an air outlet in the axle, fluidly connecting an air supply from the trailer to the air inlet and fluidly connecting an air supply to the damper assembly from the air outlet and using a controller to control a flow of compressed air between the air outlet and the damper assembly.

In another embodiment, a fluid reservoir for a steering axle mounted on a trailer, the steering axle comprises an elongated tube having two ends, with a pair of wheel assemblies, one wheel assembly of the pair of wheel assemblies being pivotally connected to each end of the elongated tube, each wheel assembly having a steering arm thereon, there being two steering arms, a rod pivotally connecting the steering arms to pivot the steering arms simultaneously about a vertical axis, a fluid stabilizer assembly mounted on the axle and connected to the steering rod, the fluid stabilizer assembly having an inflatable damper assembly thereon, a fluid reservoir located within the elongated tube, a pressurized fluid supply from the trailer being fluidly connected to a fluid inlet on the elongated tube, a fluid outlet from the elongated tube being fluidly connected to the damper assembly, the fluid stabilizer assembly dampening pivotal movement of the wheel assemblies when fluid from the fluid reservoir fills the damper assembly and allowing the wheel assemblies to rotate more freely when a pressure of fluid within the damper assembly is reduced and a controller to control a flow of pressurized fluid between the fluid outlet and the damper assembly.

In another embodiment, there is described a method of constructing a fluid reservoir for use with a steering axle mounted on a trailer, the steering axle having a pair of wheel assemblies, one wheel assembly of the pair of wheel assemblies being mounted at each end of an elongated tube, each wheel assembly having a steering arm thereon, a rod pivotally connecting the steering arms, a fluid stabilizer assembly mounted on the steering axle and being connected to the rod, the fluid stabilizer assembly having an inflatable damper assembly thereon, the method comprising locating the fluid reservoir within the elongated tube by locating a fluid inlet and a fluid outlet in the tube, fluidly connecting a pressurized fluid supply from the trailer to the fluid inlet and fluidly connecting a fluid supply from the fluid outlet to the damper assembly, operating a controller to fill the damper assembly with pressurized fluid to dampen pivotal movement of the wheel assemblies and to remove pressurized fluid from the damper assembly to allow the wheel assemblies to rotate more freely.

In another embodiment, there is described a method of constructing an air reservoir for use with a steering axle mounted on a trailer, the steering axle having a pair of rotation pivoting wheel assemblies, each wheel assembly having a rotation plate and a steering arm connected thereto, there being two rotation plates and two steering arms, a rod pivotally connecting the steering arms, each wheel assembly being rotatably connected to either end of the axle, each wheel assembly being connected to pivot about a vertical axis through each rotation plate, an air stabilizer assembly being mounted on the axle and being connected to the rod, the air stabilizing assembly having an inflatable damper assembly thereon, the method comprising locating an air reservoir for compressed air within the axle by locating an air inlet and an air outlet in the axle, fluidly connecting an air supply from the trailer to the air inlet and fluidly connecting an air supply to the damper assembly from the air outlet.

In another embodiment, an air reservoir for a steering axle is mounted on a trailer, the steering axle comprising a pair of rotation pivoting wheel assemblies. Each wheel assembly has a rotation plate and a steering arm connected thereto. A rod pivotally connects the steering arms, each wheel assembly being rotatably connected to either end of the axle. An air stabilizer assembly is mounted on the axle and is connected to the rod, the air stabilizer assembly having an inflatable damper assembly thereon. An air supply is fluidly connected to an air inlet on the axle, the air inlet being fluidly connected to the damper assembly. The air stabilizer assembly dampens pivotal movement of the wheel assemblies when compressed air from the air reservoir fills the damper assembly. The air stabilizer assembly allows the wheel assemblies to rotate more freely when pressure of the compressed air within the damper assembly is reduced.

In another embodiment, an air reservoir for a steering axle is located within the axle. An air supply from the trailer is fluidly connected to an air inlet on the axle and an air outlet from the axle is fluidly connected to a damper assembly. The axle has a drainage outlet with a closure thereon for periodically draining condensation from the axle. The air reservoir is constructed by creating an air inlet, an air outlet, and a drainage outlet in the axle, connecting an air supply from a compressed air source on the trailer to the air inlet and connecting an air supply to a damper assembly from the air outlet and using a controller to control a flow of compressed air between the air outlet and the damper assembly.

BRIEF DESCRIPTION OF THE DRAWINGS

The embodiments herein will be understood from the following description with reference to the drawings, in which.

Figure 1:
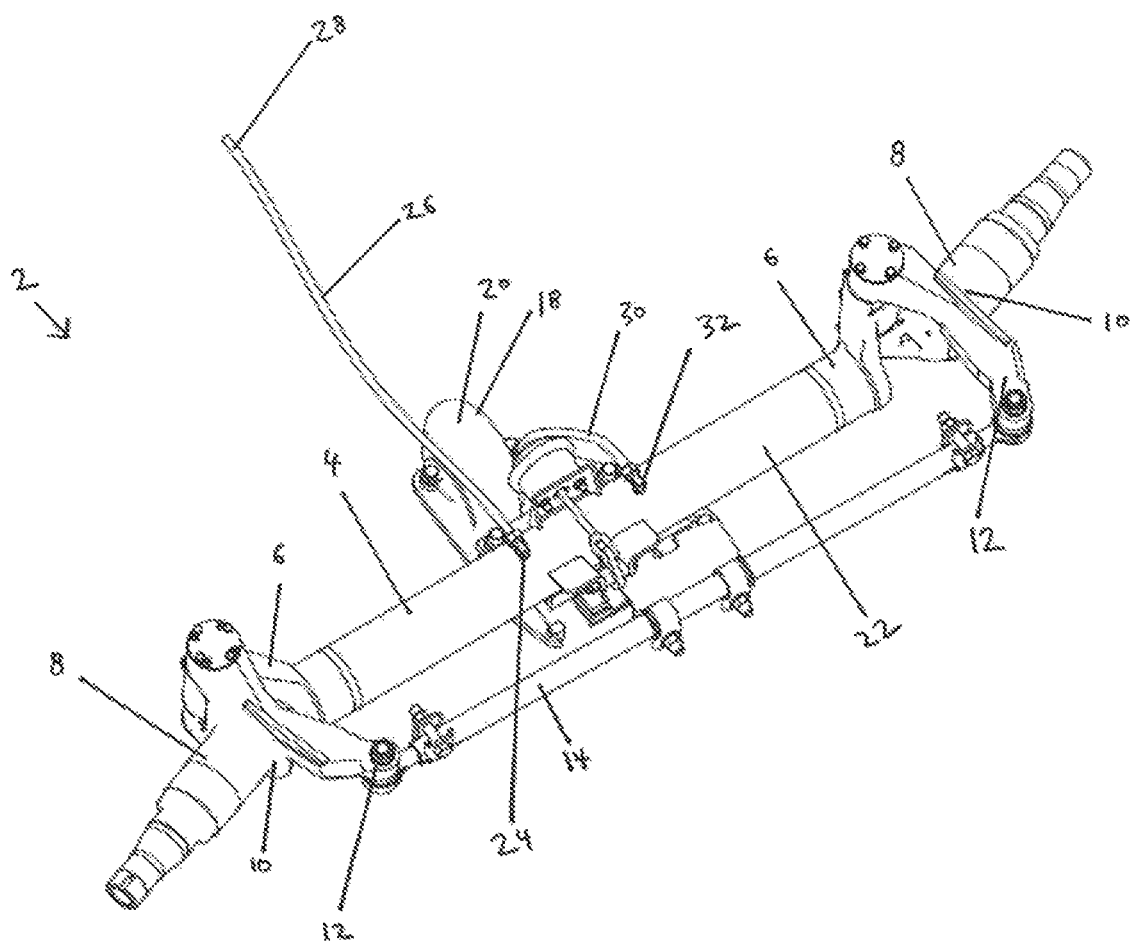
FIG. 1 is a perspective view of a steering axle in accordance with the present invention with a wheel assembly in a turning position.

In the drawings, preferred embodiments of the invention are illustrated by way of example. It is to be expressly understood that the drawings are only for the purpose of illustration and as an aid to understanding, and are not intended as a definition of the limits of the invention.

DETAILED DESCRIPTION OF PREFERRED EMBODIMENTS

In this respect, before explaining at least one embodiment of the invention in detail, it is to be understood that the invention is not limited in its application to the details of construction and the arrangements of the components outlined in the following description or illustrated in the drawings. The invention is capable of other embodiments and of being practiced and carried out in various ways. Also, it is to be understood that the phraseology and terminology employed herein are for the purpose of description and should not be regarded as limiting. In particular, all terms used herein are used in accordance with their ordinary meanings unless the context or definition clearly indicates otherwise. Also, unless indicated otherwise except within the claims the use of "or" includes "and" and vice-versa. Non-limiting terms are not to be construed as limiting unless expressly stated or the context clearly indicates otherwise (for example, "including", "having", "characterized by" and "comprising" typically indicate "including without limitation"). Singular forms included in the claims such as "a", "an" and "the" include the plural reference unless expressly stated or the context clearly indicates otherwise. Further, the stated features and/or configurations or embodiments thereof the suggested intent may be applied as seen fit to certain operating conditions or environments by one experienced in the field of art.

Figure 2:
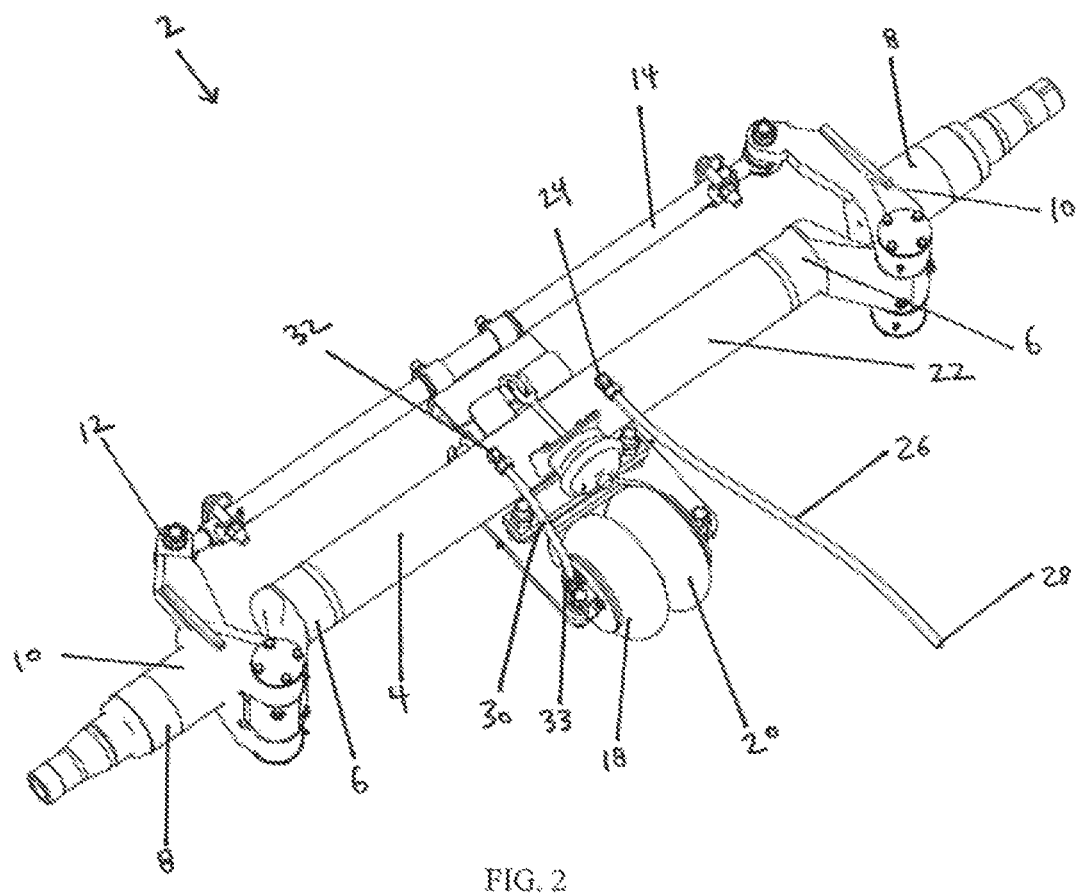
FIG. 2 is a perspective view of the steering axle in an opposite orientation to FIG. 1 with a wheel assembly in a non-turning position.

Referring to the drawings, in the embodiments shown in FIGS. 1 and 2, a steering axle denoted by reference numeral 2 has a tube section 4 with a pair of beam ends 6 and a pair of rotation pivoting wheel assemblies 8 fixed to the beam ends 6. Each wheel assembly 8 has a rotation plate 10 and a steering arm 12 connected thereto. A rod 14 is pivotally connected to an outer end 16 of each steering arm 12.

An air stabilizer assembly 18 is centrally mounted on the tube section 4. The air stabilizer assembly 18 has an inflatable damper assembly 20.

Still referring to FIGS. 1 and 2, an air reservoir 22 is located within the tube section 4, which contains an air inlet 24. An air supply 26 is fluidly connected from the trailer (or similar apparatus) air system 28 (or equivalent) to the air inlet 24. An air supply 30 is fluidly connected from an air outlet 32 from the air reservoir 22 to an air inlet 33 in the air stabilizer assembly 18. A drainage outlet 34 is located in a lower portion of the tube section 4, and has a closure 36 (not shown) therein. The drainage outlet 34 will usually be closed by the closure 36, but can be opened to drain condensation from an interior of the tube section 4. The drainage opening 34 and the closure 36 are preferably located at a bottom of the tube section 4. The closure 36 can preferably be easily opened to drain fluid from the tube section 4, and is easily reclosed. For example, the closure can be spring mounted with a spring urging the closure to the closed position in the absence of an outside force. The closure preferably has a handle or other attachment to enable the closure to be moved to the open position by exerting an external force to overcome the force of the spring.

The purpose of the air reservoir is to add compressed air (not shown) to the air stabilizer assembly 18 to inflate the damper assembly 20, which dampens out road shimmy when the trailer is proceeding generally straight ahead. The damper assembly 20 allows the steering axle 2 to track straight with the trailer (not shown).

In operation, when the trailer is proceeding through turns, the pressure of compressed air in the damper assembly 20 is preferably reduced to allow the steering axle to track through the curves in the turns more smoothly. When the trailer is proceeding in a substantially straight direction, the pressure of compressed air in the damper assembly is preferably increased to allow the steering axle to dampen out road shimmy.

Other fluids can be used in place of or together with compressed air. For example, compressed nitrogen gas can be used. As a further example, a liquid can be used instead of a gas.

A controller (not shown) can be utilized to control a flow of pressurized fluid between a fluid outlet on the elongated tube and the damper assembly.

Figure 3:
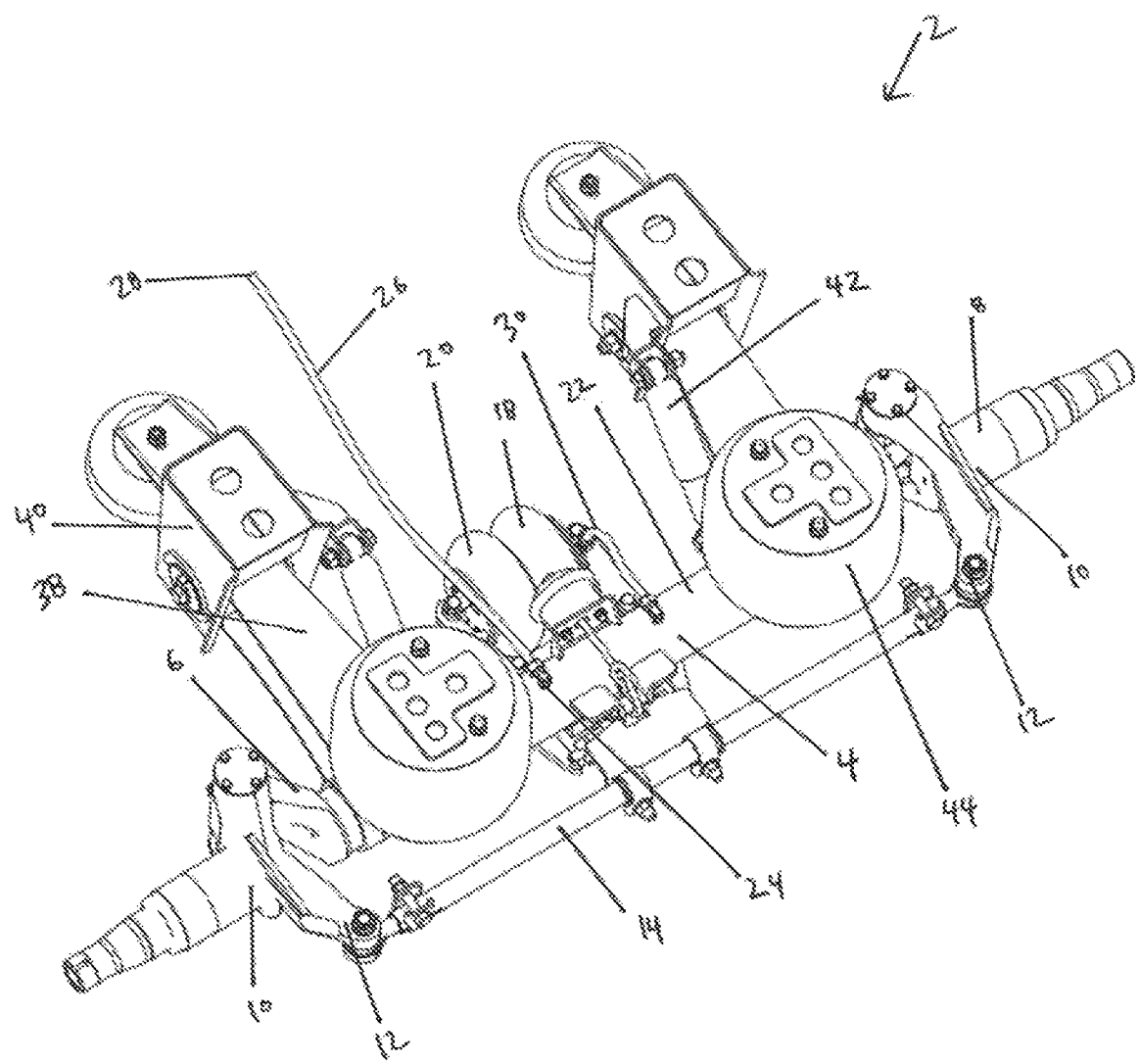
FIG. 3 is a perspective view of the steering axle with additional components added.
Figure 4:
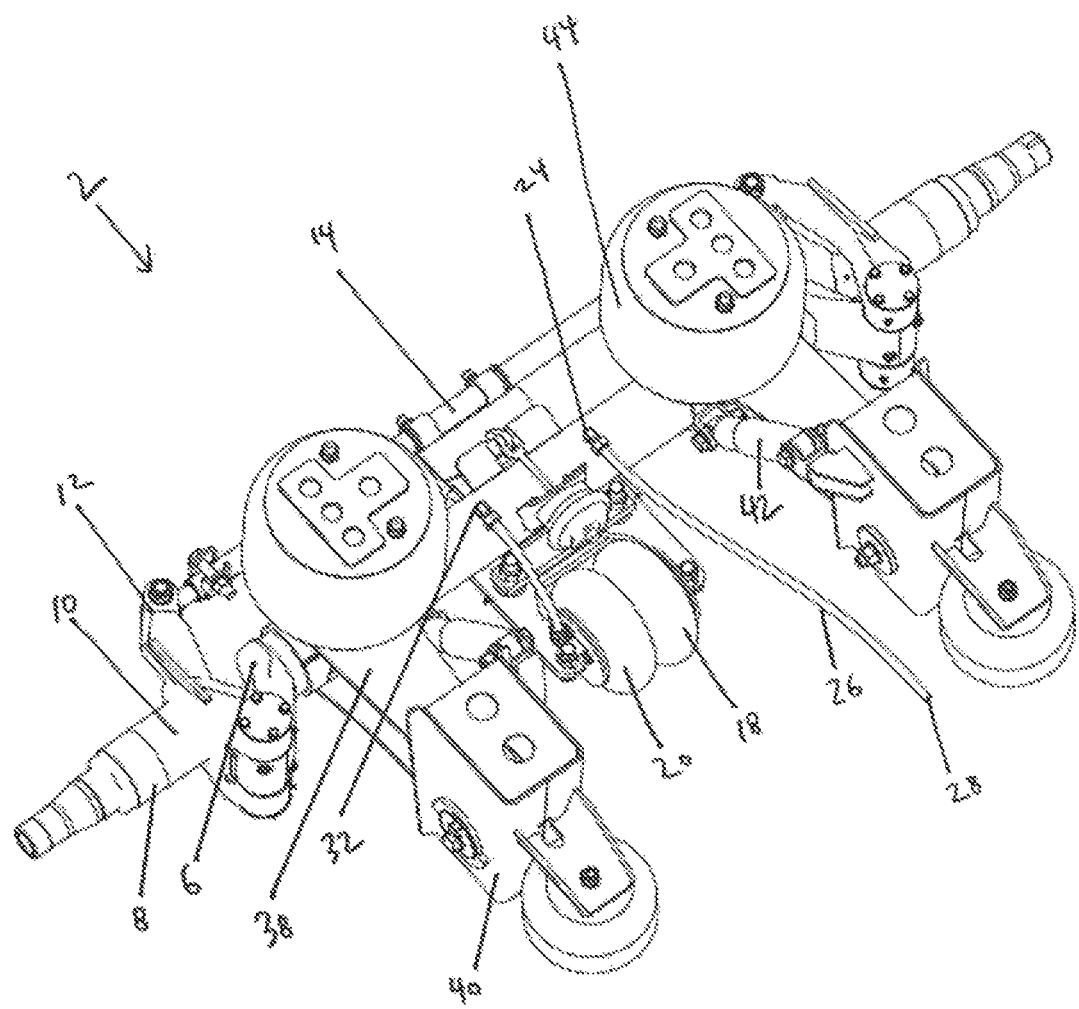
FIG. 4 is a perspective view of the steering axle of FIG. 3, oriented in an opposite direction.
Figure 5:
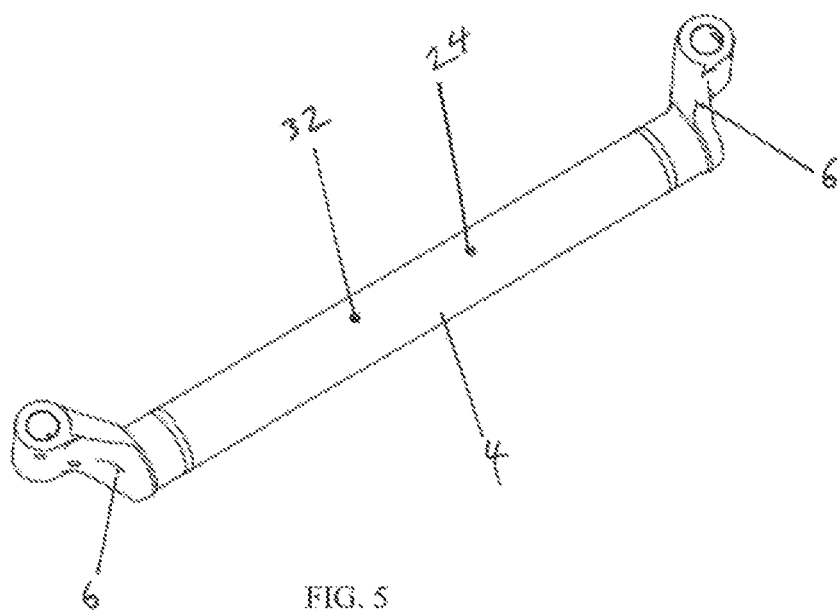
FIG. 5 is a perspective view of a tube section of the axle having beam ends thereon.
Figure 6:
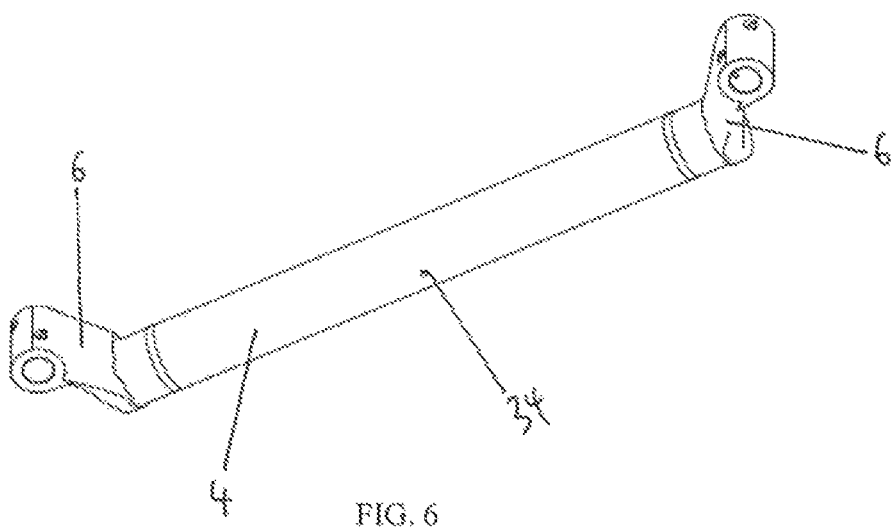
FIG. 6 is a perspective view of the tube section and beam ends of FIG. 5 oriented in an opposite direction.
Figure 7:
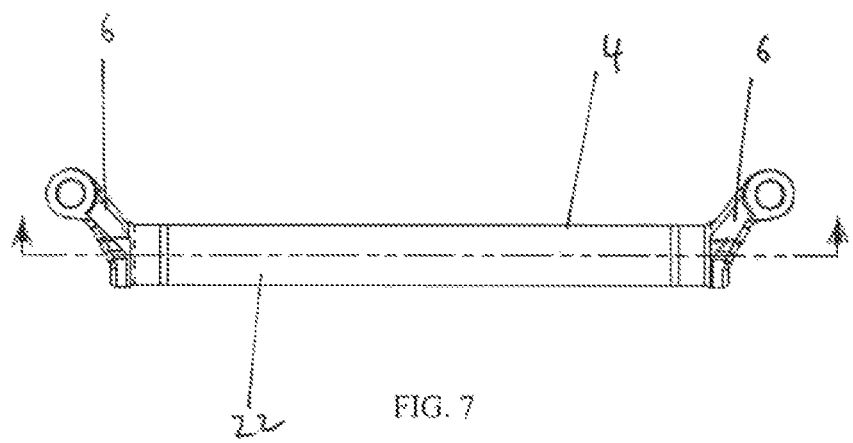
FIG. 7 is a top view of the tube sections and beam ends.
Figure 8:
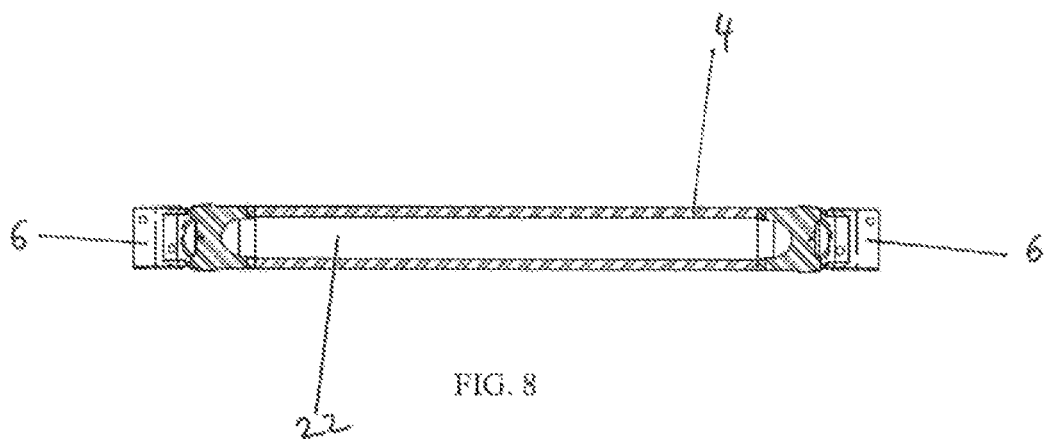
FIG. 8 is a sectional side view of the tube section and beam ends through section A-A of FIG. 7.

Referring next to FIGS. 3 and 4, additional components have been added to the steering axle 2 of FIGS. 1 and 2. The additional components comprise two beams 38, two hanger brackets 40, two shock absorbers 42, and two air springs 44. The steering axle 2 is connected to a frame (not shown) of the trailer (not shown). The additional components, the trailer and the trailer frame are conventional. Preferably, the axle is a self-steering axle.

The same reference numerals are used to FIG. 5 to 8 as those used in FIGS. 1 and 2 for those components that are identical. The air inlet 24, the air outlet 32 and the drainage outlet 34 are not shown in FIGS. 7 and 8. The tube section 4 is hollow and the shape of the air reservoir is show in FIG. 8.

Referring back to FIGS. 1 and 2, in one embodiment, the steering axle 2 is adapted for mounting on a trailer and is in operative communication with an air reservoir 22, wherein the steering axle 2 comprises a tube section 4 with a pair of rotation pivoting wheel assemblies 8 extending from opposing ends thereof, each wheel assembly 8 having a rotation plate 10 and a steering arm 12 connected thereto, there being two rotation plates 10 and two steering arms 12. A rod 14 is pivotally connected to the steering arms 12 as shown in FIGS. 1 and 2, and each wheel assembly 8 is rotatably connected to either end of the tube section 4. In particular, each wheel assembly 8 is connected to pivot about a vertical axis through each associated rotation plate 10. An air stabilizer assembly 18 is mounted on the tube section 4 and is connected to the rod 14. In the embodiments shown in FIGS. 1 and 2, the air stabilizer assembly 18 has an inflatable damper assembly 20 disposed thereon. The air reservoir 22 is located within the tube section 4, and a compressed air supply (and/or supply for other liquid or gas, or combination thereof) from the trailer (or other apparatus) (not shown) is fluidly connected to an air inlet 24 on the steering axle 2. An air outlet 32 from the steering axle 2 is fluidly connected to the damper assembly 20. The air stabilizer assembly 18 dampens pivotal movement of the wheel assemblies 8 when compressed air from the air reservoir 22 fills the damper assembly 20 and therefore allows the wheel assemblies 8 to rotate more freely when a pressure of compressed air within the damper assembly 18 is reduced. In connection with the embodiments shown in FIGS. 1 and 2, a controller is utilized to control a flow of compressed air between the air outlet 32 and the damper assembly 18. In the embodiment of the tube section 4 shown in FIG. 6, there is illustrated a drainage outlet 34 for condensation at a lower edge of the steering axle 4, the drainage outlet optionally equipped with a removable plug (not shown) or other drainage mechanism. Where the plug is utilized in connection with the drainage outlet 34, the plug may be spring mounted to open when subjected to an external force and to close when the external force is removed. As an alternative to a plug, the drainage outlet 34 may be equipped with a closure mounted therein (or thereon), the closure having an open position and a closed position.

Referring to FIGS. 3 and 4, in an apparatus and method of constructing an air reservoir 22 for use with a steering axle 2 mounted on a trailer (or similar apparatus), the steering axle 2 has a pair of beam ends 6 and a pair of rotation pivoting wheel assemblies 8, each wheel assembly 8 has a rotation plate 10 and a steering arm 12 connected thereto, there being two rotation plates 10 and two steering arms 12, a rod 14 pivotally connects the steering arms 12. Each wheel assembly 8 is rotatably connected to either end of the axle 2, such that each wheel assembly 8 is connected to pivot about a vertical axis through each rotation plate 10. An air stabilizer assembly 18 is mounted on the axle 2 and is connected to the rod 14. The air stabilizing assembly 18 has an inflatable damper assembly 20 thereon. The method of construction comprises locating an air reservoir 22 for compressed air (or other liquids and/or gases, or combinations thereof) within the axle 2 by locating an air inlet 24 and an air outlet 32 in the axle 2, fluidly connecting an air supply 26 from the trailer (or similar apparatus) to the air inlet 24 and fluidly connecting an air supply 26 to the damper assembly 20 from the air outlet 32 and using a controller to control a flow of compressed air between the air outlet 32 and the damper assembly 30.

The method recited above may optionally include the step of installing inlets and outlets in the axle by drilling holes, tapping the holes and installing an air fitting in each of the air inlet and the air outlet and a closure in the drainage outlet.

In a method of constructing a fluid reservoir for use with a steering axle 2 mounted on a trailer (or similar apparatus), the steering axle 2 has a pair of wheel assemblies 8, one wheel assembly 8 of the pair of wheel assemblies being mounted at each end of an elongated tube, each wheel assembly 8 having a steering arm 12 thereon, a rod 14 pivotally connecting the steering arms 12, a fluid stabilizer assembly mounted on the steering axle 2 and being connected to the rod 14, the fluid stabilizer assembly having an inflatable damper assembly 20 thereon, the method comprising locating the fluid reservoir within the elongated tube by locating a fluid inlet and a fluid outlet in the tube, fluidly connecting a pressurized fluid supply from the trailer to the fluid inlet and fluidly connecting a fluid supply from the fluid outlet to the damper assembly, operating a controller to fill the damper assembly with pressurized fluid to dampen pivotal movement of the wheel assemblies and to remove pressurized fluid from the damper assembly to allow the wheel assemblies to rotate more freely.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any modification, combination or permutation of any of the components, elements, functions, operations, or steps described or illustrated anywhere herein that a person having ordinary skill in the art would comprehend. All such modifications, combinations and permutations are believed to be within the sphere and scope of the invention as defined by the claims appended hereto.

I claim:

1. An air reservoir for use with a steering axle mounted on a trailer, the steering axle comprising:
   a. a tube section with a pair of rotation pivoting wheel assemblies extending from opposing ends thereof, each wheel assembly having a rotation plate and a steering arm connected thereto, there being two rotation plates and two steering arms;
   b. a rod pivotally connecting the steering arms, each wheel assembly being rotatably connected to either end of the tube section;
   c. each wheel assembly being connected to pivot about a vertical axis through each rotation plate;
   d. an air stabilizer assembly being mounted on the tube section and being connected to the rod, the air stabilizer assembly having an inflatable damper assembly thereon;
   e. the air reservoir located within the tube section, a compressed air supply from the trailer being fluidly connected to an air inlet on the axle, an air outlet from the axle being fluidly connected to the damper assembly, the air stabilizer assembly engaging with said rod and dampening pivotal movement of the wheel assemblies when compressed air from the air reservoir fills the damper assembly and allowing the wheel assemblies to rotate more freely when a pressure of compressed air within the damper assembly is reduced; and
   f. a controller to control a flow of compressed air between the air outlet and the damper assembly.

2. The steering axle as claimed in claim 1 wherein the axle has a drainage outlet for condensation at a lower edge thereof, the drainage outlet having a removable plug.

3. The steering axle as claimed in claim 2 wherein the plug is spring mounted to open when subjected to an external force and to close when the external force is removed.

4. The steering axle as claimed in claim 1 wherein the drainage outlet has a closure mounted therein, the closure having an open position and a closed position.

5. A fluid reservoir for a steering axle mounted on a trailer, the steering axle comprising:
   a. an elongated tube having two ends, with a pair of wheel assemblies, one wheel assembly of the pair of wheel assemblies being pivotally connected to each end of the elongated tube;
   b. each wheel assembly having a steering arm thereon, there being two steering arms;
   c. a rod pivotally connecting the steering arms to pivot the steering arms simultaneously about a vertical axis;
   d. a fluid stabilizer assembly mounted on the axle and connected to the steering rod, the fluid stabilizer assembly having an inflatable damper assembly thereon;
   e. a fluid reservoir located within the elongated tube, a pressurized fluid supply from the trailer being fluidly connected to a fluid inlet on the elongated tube, a fluid outlet from the elongated tube being fluidly connected to the damper assembly, the fluid stabilizer assembly engaging with said rod and dampening pivotal movement of the wheel assemblies when fluid from the fluid reservoir fills the damper assembly and allowing the wheel assemblies to rotate more freely when a pressure of fluid within the damper assembly is reduced; and
   f. a controller to control a flow of pressurized fluid between the fluid outlet and the damper assembly.

6. The fluid reservoir as claimed in claim 5 wherein the fluid is air and compressed air is supplied to the elongated tube and to the damper assembly.

* * * * *